United States Patent [19]

Woods

[11] Patent Number: 4,604,062

[45] Date of Patent: Aug. 5, 1986

[54] DRAWING/TRACING/TEMPLATE APPARATUS

[76] Inventor: Margaret H. Woods, 811 Loma Vista Pl., Santa Paula, Calif. 93060

[21] Appl. No.: 759,895

[22] Filed: Jul. 29, 1985

[51] Int. Cl.⁴ .............................................. G09B 11/04
[52] U.S. Cl. ....................... 434/88; 434/81; 434/259
[58] Field of Search ....................... 434/81, 84, 87, 88, 434/259

[56] References Cited

U.S. PATENT DOCUMENTS 1,559,665  11/1925  Beery ..................................... 434/88
2,659,163  11/1953  Albee ............................... 434/259 X
3,835,307   9/1974  Johnston ........................... 434/81 X

FOREIGN PATENT DOCUMENTS 803128  1/1969  Canada .................................. 434/84

Primary Examiner—Harland S. Skogquist
Attorney, Agent, or Firm—Albert O. Cota

[57] ABSTRACT

A drawing/tracing/template apparatus (10) that can be used by an artist and/or a teacher to perform or teach various artistic tasks including basic drawing, manuscript and cursive writing, block printing, finger painting and template/block recognition exercises. The apparatus (10) is comprised of three assemblies: a template/block assembly (12), a drawing/tracing assembly (14) and a light panel/paper roller assembly (16). Each assembly may be used independently as the drawing/tracing assembly (14) may be used in combination with the light panel/paper roller assembly. Additionally, all three assemblies may be integrally attached to form a single package that allows the apparatus (10) to be easily carried and stored.

12 Claims, 6 Drawing Figures

DRAWING/TRACING/TEMPLATE APPARATUS

TECHNICAL FIELD

The invention pertains to the general field of educational teaching aides and more particularly to an apparatus that integrally includes many of the assemblies and supporting implements necessary to teach drawing, tracing and template/block recognition skills.

BACKGROUND ART

Educators and especially art instructors frequently rely on teaching aides to assist them in their teaching tasks. When children and/or handicapped persons are being taught, a well designed and functional teaching aide is especially important. Such an aide not only simplifies and expedites the instructional period but also encourages and helps students to progress and achieve at a faster rate.

Currently available teaching aides vary from simple tracing overlays, to light tables, or as also referred to as shadow boxes, to complex electronic tracing and projecting equipment. In most cases these teaching aides are singularly designed, that is, they are designed to help teach a single artistic task. Thus, to teach several tasks, which can vary from drawing, finger painting, normal and light table tracings and template/block recognition exercises, it may be necessary to procure several individual teaching aides. This procurement is not cost effective and additional space must be allocated for storage.

A search of the prior art did not disclose any patents that read directly on the claims of the instant invention. However, the following U.S. patents were considered related:

| U.S. PAT. NO. | INVENTOR | ISSUED |
| --- | --- | --- |
| 3,740,872 | Mayo | 26 June 1973 |
| 3,662,077 | Kersten | 9 May 1972 |
| 3,512,273 | Baker | 19 May 1970 |
| 1,920,704 | Lorber | 1 August 1933 |

The Mayo patent discloses an apparatus for teaching individuals how to write. The invention is comprised of a container having a flat surface on which a paper feed mechanism manually passes paper along the container surface. The container also supports a movable sliding member that accommodates a set of blocks. Each block has an opening that defines in script from a different letter of the alphabet. The user places a pencil tip in the opening of each block, and by pressing down on the paper, writes the letter on the paper that is defined by the block(s).

The Kersten patent discloses a device for teaching children writing skills. The device utilizes a magnetic pencil which traces a letter that is externally visible on the face of the device. A steel ball follows the course of the magnetic pencil in tracing the particular letter. The attraction of the ball by the pencil will be lost if the person tracing the letter lets the pencil deviate from the pattern of the letter. If this occurs, the ball falls into a collection box to return to the start of the letter for a second attempt. If the person follows the pattern of the letter to its completion a light is automatically illuminated to indicate a successful attempt.

The Baker patent discloses a teaching device useful for teaching the formation of characters such as letters and geometric shapes. The invention includes a worksheet having in one area, a latent image of a character that is traced onto an overlaying cover by a stylus. The invention has a means associated with the area surrounding the image that prevents the development of the character if the stylus strays from the path of the character. Thus, the latent image may be developed with clear definition only by accurately tracing over the character.

The Lorber patent discloses a tracing chart consisting of a multiplicity of tracing sheets bound together in a covered binder and a chart having characters that are visable through a tracing sheet. To use the invention, the chart is inserted beneath the upper tracing sheet and the characters on the chart are traced on the sheet. After the sheet is used, it may be torn out or folded back against the front cover of the binder if a permanent record is desired.

DISCLOSURE OF THE INVENTION

The drawing/tracing/template apparatus provides the artist or teacher with a compact apparatus that includes within a single integral structure all the assemblies that are necessary to draw, trace and perform template/block recognition exercisers. The apparatus is comprised of three assemblies: a template/block assembly a drawing/tracing assembly and a light panel/paper roller assembly. Each assembly may be used individually or all three may be combined to allow the apparatus to be easily transported and stored.

The template/block assembly is particularly useful to teach children and handicapped persons motor skills and recognition of various geometric shapes.

The drawing/tracing assembly serves as a tracing device that uses selectable art masters to teach basic drawing, manuscript and cursive writing and block printing. The art master is inserted into an art master slot and viewed through a transparent panel located on a water-tight drawing and tracing area. Because the area is water-tight it can also be used for finger painting when the area is covered with a gel.

The drawing/tracing assembly has an opening into which the light panel/paper roller assembly is inserted. This assembly includes a paper roller subassembly that may be selectively rotated to expose an art master that can be viewed through the transparent panel in the drawing/tracing assembly. When the paper roll is removed from the viewing area, the assembly can be used as a conventional light table suitable for tracing, headline setting and general artistic layouts.

The primary object of the invention is to provide an integral compact apparatus that can be used by an artist and/or a teacher to perform or teach a variety of artistic tasks. Some of these tasks include basic drawing, manuscript and cursive writing, block printing, finger painting and template/block recognition exercises. In addition, it is also an object of the invention to provide an apparatus that can be:

easily transported and stored,
used by persons of all ages and various skill levels,
used for remediation, instruction and practia,
used as a transition from large muscle to fine muscle coordination, and
cost-effectively manufactured.

BEST MODE FOR CARRYOUT OUT THE INVENTION

Figure 1:
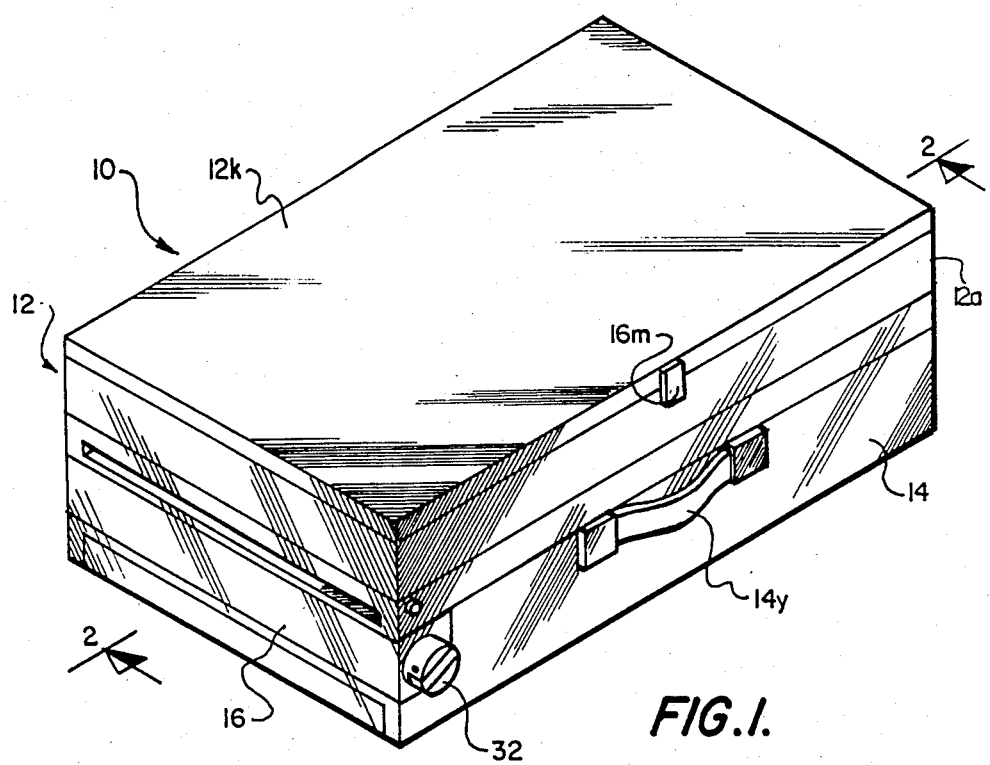
FIG. 1 is a perspective view of the apparatus shown in its storage and carrying configuration.

The best mode for carrying out the invention of the drawing/tracing/template apparatus 10 is presented in terms of a single preferred embodiment that is comprised of three assemblies: a template/block assembly 12, a drawing/tracing assembly 14 and a light panel/paper roller assembly 16. Each of these assemblies can be collectively packaged into a single unit, as shown in FIG. 1, that can be easily stored and transported.

The purpose of the apparatus 10 is to function as a multi-use multi-age educational teaching device. The apparatus is designed to primarily teach children and handicapped persons writing and drawing skills, by use of art masters and tracing techniques, and motor and form identification skills, by use of templates and corresponding blocks. Additionally, the light panel/paper assembly 16 can be used independently or in combination with the drawing assembly 14, by both children or adults, to trace and compose designs, characters, forms and the like.

Figure 2:
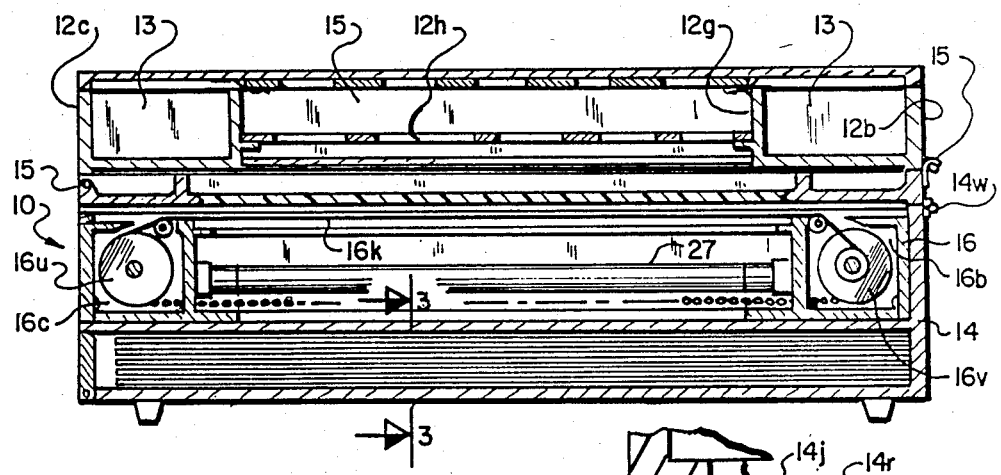
FIG. 2 is a cross-sectional view taken along lines 2—2 of FIG. 1 showing how the three assemblies are packaged and stacked.
Figure 4:
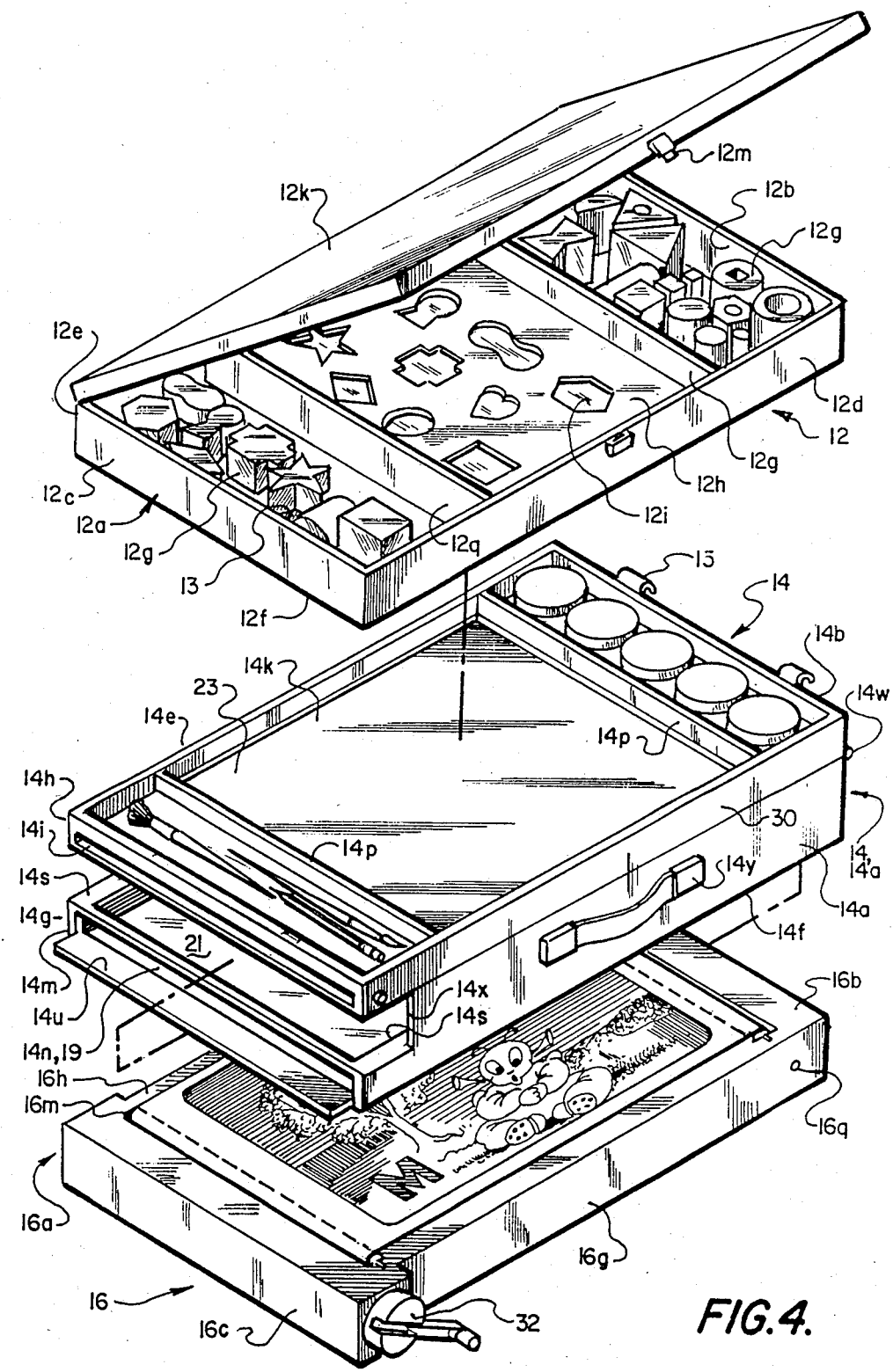
FIG. 4 is an exploded perspective view showing each of the assemblies that comprise the apparatus.

The first item described is the template/block assembly 12. This assembly, as shown in FIGS. 2 and 4, is primarily designed to be used by children and handicapped students to learn gross and fine motor control coordination skills and to teach form recognition. The assembly 12 is comprised of a first rectangular structure 12a having a right side panel 12b and a left side panel 12c integrally attached to a front panel 12d, a back panel 12e. A bottom panel 12f is also integrally attached to the bottom edges of the structure 12.

A set of partition slats 12g are rigidly attached between the front and back panels 12d, 12e, as shown in FIG. 4. When the partition slats are in place, a set of utility trays 13 are formed on each side with a template compartment 15 in the center.

The template compartment 15 is used to enclose a master template 12h that has a plurality of cutouts 12i of various shapes and sizes. The corresponding plurality of blocks 12j that fit into the cutouts 12i may be stored on the utility trays 13.

In the preferred embodiment a cover 12k is included, as shown in FIG. 4, that is hinged to the back panels 12e. A locking device 12m is also attached between the front of the cover and front panel 12d to allow the cover to be locked when not in use or when in storage.

In the preferred embodiment the assembly 12 as well 30 as the other assemblies 14, 16 are for the most part, integrally constructed of a plastic material. However, if desired the individual sections comprising the assemblies may be individually manufactured of plastic or various other materials such as wood or metal and conventionally attached in place. The drawing/tracing assembly 14, as shown in FIGS. 2 and 4, is primarily designed to teach children and handicapped persons basic writing and drawing skills by use of a master template or by applying a layer of gel inside the drawing compart 14.

The assembly 14 is comprised of a second rigid rectangular structure 12a having outside perimeter dimensions identical to those of the template/block assembly 12. Thus, the assembly 14 is designed to be attached to the assembly 12, as best shown in FIG. 4, by means of a combination tab and hook lock 15. The assembly 12 is placed over the assembly 14 and located when so desired or during storage and/or transportation. A carrying handle 14y is attached to the outside of the front panel 14d to facilitate carrying. The second rigid rectangular structure includes a right side panel 14b and a combination left side panel/entry section 14g that are integrally attached to a front panel 14d a back panel 14e, and a bottom panel 14f integrally attached to the bottom edges of the structure 14a.

Figure 3:
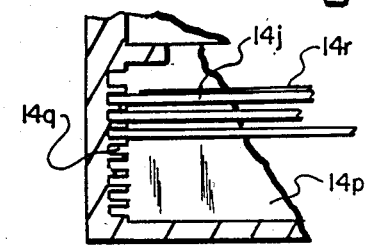
FIG. 3 is a cross-sectional view taken along lines 3—3 of FIG. 2 showing shelves attached to the shelf slots in the storage compartment.

The combination left side panel/entry section 14g serves as a structural panel, a storage compartment 19 and as an entry and exit port for art masters 17, and the light panel/paper roller assembly 16 described infra. The section 14g is comprised of an upper section 14h having a horizontally located master drawing slot 14i into which is inserted a selectable art master 17 and a lower section 14m having a horizontally located storage compartment slot 14n that serves as the entry into the storage compartment 19. The storage compartment, as best shown in FIG. 3, includes a plurality of shelf slots 14q longitudinally located across the front and back panels 14d, 14e within the area encompassing the storage compartment 19. Into these slots 14g is inserted a selectable quantity of shelves 14r. A storage compartment door 14u may also be hingedly attached to the lower edge of the storage compartment 14p as shown in FIG. 4.

Along the inside perimeter of the assembly 14 parallel and normal to the upper edge of the storage compartment slot 14n, as best shown in FIG. 4, is located an integral light panel/paper roller ledge 14s. Thus, the open area defined by the light panel/paper roller ledge 14s, the bottom surface of the master drawing slot 14i and the inside surfaces of the front and back panels 14d, 14e forms the light panel/paper roller assembly entry and exit prot 21. The entry and exit port also has a cutout that serves as a stop 14x for the light panel/paper roller assembly 16.

Around the inside perimeter of structure 14a just below its upper edge and parallel to the top edge of the master drawing slot 14i is located a transparent panel attaching ledge 14j. Attached to this panel is a first transparent panel 14k that when in place forms a shallow drawing tracing area 23. The edges of the transparent panel 14k are sealed with a water resistant compound so when using water colors or a finger painting gel the water tight panel will prevent any fluid from seeping into the remaining structure.

To add further utility to the invention 10, a set of partition slats 14p may be rigidly attached between each of the front and back panels 14d, 14e as shown in FIG. 4. When the partitions are in place they form a set of utility trays that may be used to store pencils, brushes etc. or a set of paints and/or gels.

Just below the lower edge of the master drawing slot 14i is also located along the inside perimeter of the assembly 14 a master drawing holding ledge 14t. On top of this ledge is rigidly attached a second transparent panel 14v. This panel serves as a holder for the art master and allows the light from the light panel 16 to shine through to aid in tracing or to add a light effect when using the shallow tracing area for finger painting.

As an alternate design, the drawing/tracing assembly 14 may be divided into two sections at a split interface located just below the master drawing slot 14*i* as shown in FIG. 4. A removable hinging means 14*w* is attached on the outside of the right side panel along the split interface dividing the top section from the bottom section. The hinge 14*w* allows the top section 30 to be raised when a multiple or composite art master is employed or for maintenance of the transparent panels 14*k*, 14*v*.

The two section designs also allows the top section 30 to be completely removed from the assembly 14 by unhinging it from the removable hinge 14*w*. When so removed, the upper section 30 functions as a light weight, easily carried and very portable unit that may be used, from either side, to trace, draw or for finger painting.

The final assembly described is the light panel/paper roller assembly 16 as also shown in FIGS. 2, 4, 5 and 6. This assembly may be used as a conventional light panel either independently or in combination with the drawing/tracing assembly 14 or as a source of art masters that can be used with or without light for tracing. The art masters, in this case, are on a paper roll which is rotatably operated to select the desired art master. When the assembly is used as a conventional light table the paper roll is removed from the viewing area.

The light panel/paper roller assembly 16 is comprised of a third rigid rectangular structure 16*a* having outside perimeter dimensions that allow the assembly 16 to be inserted into and retracted from the light panel/paper roller entry and exit port 21 located on the drawing/tracing assembly 14. The assembly is shown inserted in FIG. 2.

Figure 5:
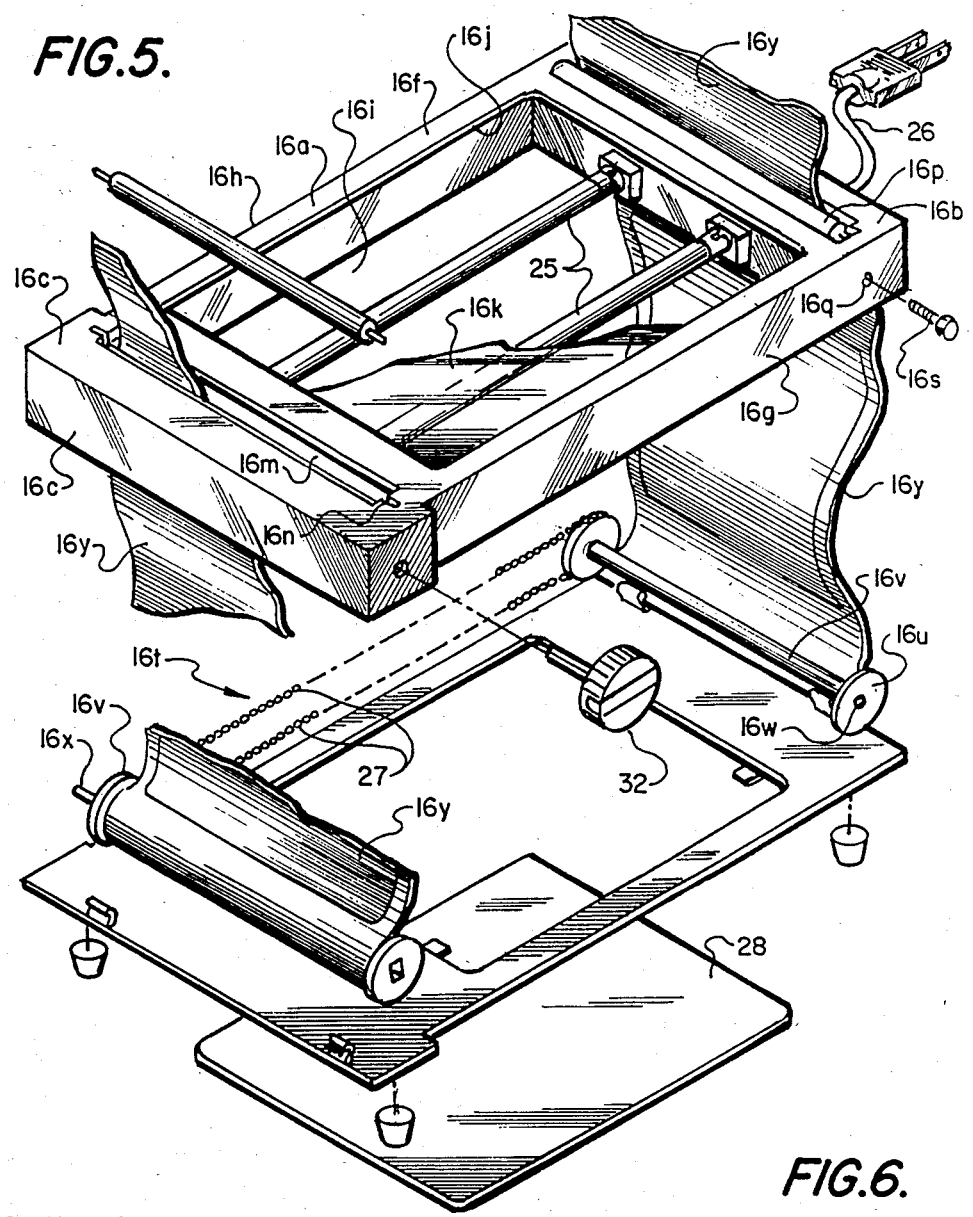
FIG. 5 is an exploded perspective view of the light panel/paper roller assembly.
Figure 6:
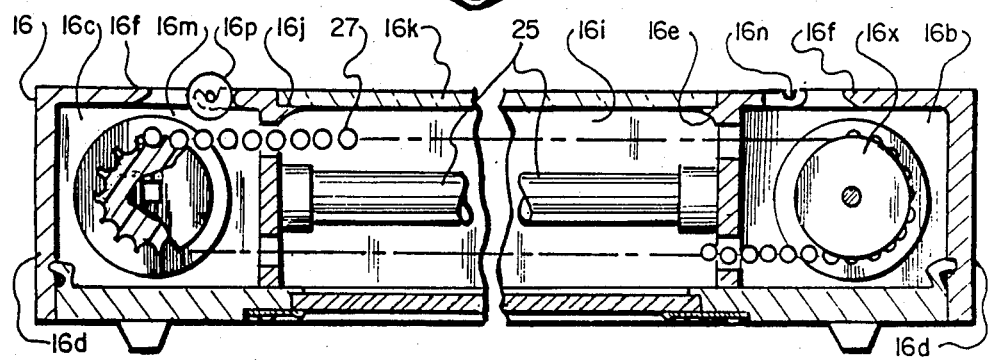
FIG. 6 is a cross-sectional side view of the light panel/paper roller assembly.

The structure 16*a* has a right paper spool compartment 16*b* and a left paper spool compartment 16*c*. Each of these compartments, as best shown in FIG. 5, has an outer wall 16*d*, an inner wall 16*e*, and an upper wall 16*f* that is in integrally attached to a front panel 16*g* and a back panel 16*h*. The area encompassed by the inner walls 16*e* of the compartments 16*a*, 16*b* and the inside walls of the front and back panels 16*g*, 16*h* forms a light compartment 16*i* as best shown in FIG. 5. The light compartment has a translucent panel mounting ledge 16*j* around and just below its upper inside perimeter to which is removably attached a translucent panel 16*k*. Within the compartment is located a set of fluorescent lights 25 that are conventionally attached and that are provided with a power cord 26 and an on-off switch (not shown). Each of the compartments has on its upper wall 16*f* a paper slot 16*m* that extends therethrough, a set of idler inserts 16*n* on each end of the paper slot 16*m*, and a paper roll axle bore 16*q* on each side of the compartments 16*b*, 16. The left side compartment 16*c*, as shown in FIGS. 4 and 5, is designed with sides that extend beyond the plane of the front and back panels 16*g*, 16*h*. The amount of the extension is sized so that the inside of this extension abuts with the stop 14*x* on the drawing/tracing assembly 14.

The paper roller subassembly 16*t* provides the means by which various types of art subjects can be easily selected. The paper roll 16*y* can be designed with various artistic subjects. For example, one roll can include a specific artistic subject that includes a variety of art masters that relate to the subject. Another roll may include a sequential set of drawings where to complete the artistic scene all the drawings must be traced. Such a sequential set would include, but not limited to, cartoon characters and mechanical construction. The paper roller subassembly 16*t* is comprised of a right paper roll spool 16*u* and a left paper roll spool 16*v*. The right spool 16*u* is housed within the right paper spool compartment 16*b* and the left spool in the left paper spool compartment 16*c*. The spool is rotatably mounted by inserting the spool axle 16*r* through a paper roll axle bore 16*q* located on each end of the compartments 16*b*, 16*c* and inserting the external spool axle 16*s* into a spool axle bore 16*w* in the axle 16*r* of the right spool 16*u*. Into the axle bore 16*w* of the left compartment 16*c* is inserted a paper winding knob 32 that allows the spools to be rotated to the desired art master panel.

Each paper roll spool 16*u*, 16*v* has attached on one end a spool gear 16*x*. Around the two gears is an endless chain 27 that causes a simultaneous rotation when the right spool is rotated by rotating a paper winding knob that project from the side of the left paper spool compartment and that is rigidly attached to the left paper spool 16*v*. The chain 27 has a means to be adjusted for tautness when the chain is around the gears. Around the two spools is attached the art master paper roll 16*y*. The roll projects through the left paper slot 16*m* over a paper idler 16*p*, extends over the light compartment 16*i*, over a second paper idler 16*p* into the right paper slot and finally attached to the right paper roll spool 16*r*.

Attached to the bottom of the third rectangular rigid structure is a bottom service plate 16*z*. The plate may have a cutout, as shown in FIG. 5, that allows a fluorescent light service panel 28 to be attached. Rubber feet may also be included on each end of the service panel to allow the assembly to be placed on any surface.

While the invention has been described in complete detail and pictorially shown in the accompanying drawings, it is not to be limited to such details, since many changes and modifications may be made to the invention without departing from the spirit and the scope thereof. Hence, it is described to cover any and all modifications and forms which may come within the language and scope of the claims.

I claim:

1. A drawing/tracing/template apparatus comprising:
    A. a template/block assembly further comprising:
        (a) a first rigid rectangular structure having a template compartment,
        (b) a removable master template having a plurality of cutouts and sized to fit into said template compartment,
        (c) a plurality of blocks sized to fit into said cutouts in said master template,
    B. a drawing/tracing assembly further comprising a second rigid rectangular structure having outside perimeter dimensions that allows said first rigid rectangular structure to be stacked and be locked in place, by a locking means, to the top of said second rigid rectangular structure, with said second rigid rectangular structure having:
        (a) a shallow drawing/tracing area covered on top with a first transparent panel,
        (b) a combination left side panel/entry section further having:
            (1) a master drawing slot into which is inserted an art master that can be viewed through said first transparent panel, (2) a light panel/paper roller entry and exit port,
C. a light panel/paper roller assembly further comprising a third rigid rectangular structure having outside perimeter dimensions that allows it to be inserted into and extracted from the light panel/paper roller entry and exit port on said combination left side panel/entry section with said third rigid rectangular structure having:
   (a) a light compartment covered on top with a translucent panel,
   (b) a set of lights internally located within said light compartment,
   (c) a left compartment housing a left paper roll spool that is rotatably attached,
   (d) a right compartment housing a right paper roll spool that is rotatably attached,
   (e) a paper roll incorporating a set of art masters where one end of roll is attached to said left paper roll spool and other end of paper is pulled over the top of said translucent panel and attached to said right paper roll spool, and
   (f) means to simultaneously rotate said paper roll spools to control the position of the art master being viewed over said translucent panel.

2. The template/block assembly as specified in claim 1 further comprising a cover sized to fit around the outside perimeter of said first rectangular structure and that is hingedly attached to the back panel of said first rectangular structure.

A. a template/block assembly further comprising:
   (a) a first rigid rectangular structure having a right side panel and a left side panel integrally attached to a front panel and a back panel, and a bottom panel integrally attached to the bottom edges of said first rigid rectangular structure,
   (b) a set of partition slats rigidly attached between each of said front and back panels where upper edge of said partitions are parallel with upper edges of said front and back panels and lower side of said partitions rest against the top of said bottom panel such that when said partitions are in place a set of utility trays are formed on each side with a template compartment in the center,
   (c) a master template sized to removably fit into said template compartment and having therethrough a plurality of cutouts of various shapes and sizes, and
   (d) a plurality of blocks shaped to fit into the corresponding cutouts located on said master template where said blocks may be stored, when not in use, in said utility trays.
B. a drawing/tracing assembly further comprising:
   (a) a second rigid rectangular structure having outside perimeter dimensions identical to those of said template/block assembly to allow both of said assemblies to be stacked and locked in place by a locking means, with said second rigid rectangular panel having a right side panel and a combination left side panel/entry section integrally attached to a front panel and a back panel, and also having a bottom panel integrally attached to the bottom edges of said second rigid rectangular structure, where said combination left side panel/entry section further comprises:
      (1) an upper section having a horizontally located master drawing slot therethrough,
      (2) a lower section having a horizontally located storage compartment slot therethrough that serves as the entry into a storage compartment,
      (3) a light panel/paper roller ledge integrally attached along the inside perimeter of said assembly parallel and normal to the upper edge of said storage compartment slot where the open area defined by said light panel/paper roller ledge the bottom surface of said master drawing slot and the inside surfaces of said front and back panels forms a light panel/paper roller entry and exit port, with the front of said port having a cutout that serves as a stop for said light panel/paper roller assembly,
   (b) a transparent panel attaching ledge located around the inside perimeter of said second rigid rectangular structure just below its upper edge and parallel to the top edge of the master drawing slot,
   (c) a first transparent panel sized to fit and be sealed to the upper edge of said transparent panel attaching ledge such that when said transparent panel is in place a shallow drawing/tracing area is formed,
   (d) a master drawing holding ledge integrally attached along the inside perimeter of said assembly parallel and just below the lower edge of said master drawing slot,
   (e) a second transparent panel sized to fit and be rigidly attached to the upper edge of said master drawing holding ledge such that the top of said second transparent panel is parallel to the upper edge of said master drawing slot,
C. a light panel/paper roller assembly further comprising:
   (a) a third rigid rectangular structure having outside perimeter dimensions that allow said light panel/paper roller assembly to be inserted into and retracted from said light/panel paper roller entry and exit port located on said drawing/tracing assembly, with said third rigid rectangular structure having a right paper spool compartment and a left paper spool compartment where each of said compartments has an upper wall, an outer wall and an inner wall that are integrally attached to a front panel and a back panel where the area encompassed by the inside walls of said compartments and the inside walls of said front and back panels forms a light compartment that extends therethrough where said light compartment has a ledge located around and just below its upper inside perimeter, and with each compartment having on its upper wall a paper slot extending therethrough, a set of idler inserts on each end of said paper slots and a paper roll axle bore on each side, and where said left paper spool compartment has sides that extend beyond the plane of said front and back panels,
   (b) a paper roll subassembly comprising:
      (1) a right paper roll spool and a left paper roll spool with each of said spools having a spool bore on one end where said spools are rotatably inserted within the right paper spool compartment and left paper spool compartment respectively where spool is held in place by inserting one end of spool through a paper axle bore and the other end by inserting an external spool axle through said spool axle bore, (2) a spool gear attached to one side of each of said paper roll spools when said chains are driven by an endless loop drive chain sized to fit around said two gears where said gears are rotated simultaneously when said right spool is manually rotated by a paper winding knob attached to said right spool, (3) a paper roll idler inserted into each set of said idler inserts, (4) a paper roll where one end is attached to the left paper roll spool and the other end to the right paper roll spool where paper extends over the tops of said paper roll idlers, (5) a set of fluorescent lights conventionally attached within said light compartment where said fluorescent lights are provided with a power cord and a power on/off switch, (6) a translucent panel inserted over the ledge around said light compartment, and (7) a bottom service plate removably attached to the bottom of said third rigid rectangular structure.

3. A drawing/tracing/template apparatus comprising in combination:

4. The template/block assembly as specified in claim 2 further comprising a locking means to lock said cover to the front panel of said first rectangular structure.

5. The drawing/tracing assembly as specified in claim 2 further comprising a plurality of shelf slots formed longitudinally across the front and back panels of said second rectangular structure within the area encompassing said storage compartment.

6. The drawing/tracing assembly as specified in claim 5 further comprising a plurality of shelves sized to fit into said shelf slots.

7. The drawing/tracing assembly as specified in claim 3 further comprising a set of partition slats rigidly attached between each of the front and back panels of said second rectangular structure where upper edge of said partitions are parallel with the upper edges of said front and back panels and lower edges rest against the top of said transparent panel such that when partitions are in place a set of utility trays are formed.

8. The drawing/tracing assembly as specified in claim 3 further comprising a storage compartment door hingedly attached to the lower edge of said storage compartment.

9. The drawing/tracing assembly as specified in claim 3 further comprising a carrying handle attached to the outside of the front panel of said second rectangular structure.

10. The light panel/paper roller assembly as specified in claim 3 wherein said drive chain has the means to be adjusted for tautness when said chain is around said gears.

11. The light panel/paper roller assembly as specified in claim 3 further comprising a bottom service plate removably attached to the bottom side of said third rigid rectangular structure.

12. The light panel/paper roller assembly as specified in claim 3 wherein said drawing/tracing assembly is further comprised of a top section and a bottom section where said two sections are held in place by a removable hinging means attached on the outside of said right side panel along the split interface dividing said top section from said bottom section.

* * * * *